US012276442B2

(12) United States Patent
McCormick

(10) Patent No.: US 12,276,442 B2
(45) Date of Patent: Apr. 15, 2025

(54) MULTI-TEMPERATURE HEAT COLLECTION SYSTEM

(71) Applicant: Photon Vault, LLC, San Ramon, CA (US)

(72) Inventor: Kentwell Lee McCormick, San Ramon, CA (US)

(73) Assignee: PHOTON VAULT, LLC, San Ramon, CA (US)

( * ) Notice: Subject to any disclaimer, the term of this patent is extended or adjusted under 35 U.S.C. 154(b) by 468 days.

(21) Appl. No.: 17/093,063

(22) Filed: Nov. 9, 2020

(65) Prior Publication Data

US 2022/0146151 A1    May 12, 2022

(51) Int. Cl.
*F24S 10/20*    (2018.01)
*F24S 10/70*    (2018.01)
(Continued)

(52) U.S. Cl.
CPC .............. *F24S 10/20* (2018.05); *F24S 10/70* (2018.05); *F24S 23/71* (2018.05); *F24S 30/40* (2018.05);
(Continued)

(58) Field of Classification Search
CPC ........ Y02B 10/20; Y02B 30/52; Y02B 30/54; F24S 10/502; F24S 80/20; F24S 80/525;
(Continued)

(56) References Cited

U.S. PATENT DOCUMENTS 3,626,149 A    12/1971    Carney
3,951,129 A *  4/1976    Brantley, Jr. ......... F24S 10/502
126/649
(Continued)

FOREIGN PATENT DOCUMENTS

CA    3019409 A1    3/2020
CN    202734275 U    2/2013
(Continued)

OTHER PUBLICATIONS

International Search Report issued on Sep. 13, 2021 in PCT/US2021/039287.
(Continued)

*Primary Examiner* — Jorge A Pereiro
(74) *Attorney, Agent, or Firm* — Davis Malm & D'Agostine, P.C.; David J. Powsner

(57) ABSTRACT

The invention provides in some aspects a thermal energy collection system comprising a first solar collector through which a first heat transfer fluid flows to absorb energy from sunlight as it passes through the first solar collector, and a second solar collector that collects energy from sunlight that has passed through the first solar collector. The first heat transfer fluid of the thermal energy collection system according to these aspects of the invention is in thermal coupling with the first solar collector, but not with the second solar collector. In other aspects, the invention provides a radiator system, comprising a multi-wall panel, an interior of which is in fluid coupling with, and that forms part of, a fluid circuit through which a first heat transfer fluid flows. A reflective surface is disposed in a vicinity of a second face of the multi-wall panel. Still other aspects of the invention provide a reflective film solar energy collector and a solar energy absorber.

2 Claims, 7 Drawing Sheets

(51) Int. Cl.
| | | |
|---|---|---|
| *F24S 23/71* | (2018.01) | |
| *F24S 30/40* | (2018.01) | |
| *F24S 60/00* | (2018.01) | |
| *F24S 70/20* | (2018.01) | |
| *F24S 70/65* | (2018.01) | |
| *F24S 80/00* | (2018.01) | |

(52) U.S. Cl.
CPC ............... *F24S 60/00* (2018.05); *F24S 70/20* (2018.05); *F24S 70/65* (2018.05); *F24S 2080/03* (2018.05)

(58) Field of Classification Search
CPC .. F24S 10/20; F24S 10/25; F24S 10/30; F24S 23/71; F24S 23/715; F24S 10/501; F24D 11/0221
See application file for complete search history.

(56) References Cited

U.S. PATENT DOCUMENTS

| | | | | |
|---|---|---|---|---|
| 3,981,294 | A | 9/1976 | Deminet | |
| 4,005,583 | A * | 2/1977 | Ramey | F24S 10/00 62/235.1 |
| 4,011,855 | A * | 3/1977 | Eshelman | F24S 23/80 126/685 |
| 4,059,094 | A * | 11/1977 | Barrio de Mendoza | F24S 23/74 126/677 |
| 4,082,082 | A * | 4/1978 | Harvey | F24S 10/501 126/674 |
| 4,114,598 | A * | 9/1978 | Van Leeuwen | F24S 10/753 165/76 |
| 4,114,599 | A | 9/1978 | Stephens | |
| 4,117,831 | A | 10/1978 | Bansal | |
| 4,143,643 | A * | 3/1979 | Gerin | F24S 23/74 136/246 |
| 4,200,148 | A | 4/1980 | Friefeld | |
| 4,210,201 | A | 7/1980 | O'Hanlon | |
| 4,232,820 | A * | 11/1980 | Ritter | F24S 50/00 62/235.1 |
| 4,243,020 | A * | 1/1981 | Mier | F24S 80/40 165/170 |
| 4,257,398 | A | 3/1981 | Watson | |
| 4,257,481 | A | 3/1981 | Dobson | |
| 4,274,395 | A * | 6/1981 | Bangs | F24S 10/55 126/634 |
| 4,308,857 | A * | 1/1982 | Sims | F24S 10/75 126/684 |
| 4,309,984 | A * | 1/1982 | Dorbeck | F24S 10/748 126/599 |
| 4,340,034 | A * | 7/1982 | Hopper | F24S 80/70 126/685 |
| 4,360,005 | A * | 11/1982 | Sharpe | F24S 80/525 126/599 |
| 4,373,513 | A | 2/1983 | Materna | |
| 4,483,321 | A * | 11/1984 | Sharpe | F24S 40/50 165/46 |
| 4,485,804 | A * | 12/1984 | Sharpe | F24S 40/53 165/135 |
| 4,551,987 | A * | 11/1985 | Cutlip | F25B 39/00 62/238.7 |
| 4,586,489 | A * | 5/1986 | Voll | F24S 23/10 126/657 |
| 5,069,199 | A | 12/1991 | Messner | |
| 7,615,970 | B1 * | 11/2009 | Gimlan | H01M 16/003 320/166 |
| 9,404,673 | B2 * | 8/2016 | Swift | F24S 20/67 |
| 9,612,064 | B2 | 4/2017 | Langer et al. | |
| 9,932,830 | B2 | 4/2018 | Laughlin | |
| 10,288,357 | B2 | 5/2019 | Laughlin et al. | |
| 11,125,469 | B2 * | 9/2021 | Otanicar | F24S 20/20 |
| 2005/0199234 | A1 * | 9/2005 | Leighton | F24S 20/67 126/621 |
| 2006/0272796 | A1 | 12/2006 | Asmussen | |
| 2008/0156314 | A1 | 7/2008 | Heuer | |
| 2009/0095282 | A1 | 4/2009 | Cramer | |
| 2010/0314081 | A1 | 12/2010 | Reis | |
| 2011/0290153 | A1 | 12/2011 | Abdullah | |
| 2012/0060501 | A1 | 3/2012 | Hemrle | |
| 2012/0167952 | A1 * | 7/2012 | Yashiki | F22B 1/006 60/641.15 |
| 2012/0199331 | A1 | 8/2012 | Maurer | |
| 2012/0312292 | A1 | 12/2012 | Bahl | |
| 2014/0060051 | A1 | 3/2014 | Ohler | |
| 2015/0377515 | A1 * | 12/2015 | Russell | B23P 15/26 126/646 |
| 2016/0108761 | A1 | 4/2016 | Frazier | |
| 2016/0160864 | A1 | 6/2016 | Becquin | |
| 2017/0275190 | A1 | 9/2017 | Eziyi | |
| 2019/0331098 | A1 | 10/2019 | von Behrens | |

FOREIGN PATENT DOCUMENTS

| | | | |
|---|---|---|---|
| CN | 210154394 U | 3/2020 | |
| DE | 19643438 A1 * | 4/1998 | ............ A01G 9/246 |
| DE | 10341299 | 3/2005 | |
| DE | 102009014235 A1 | 9/2010 | |
| EP | 2241737 | 10/2010 | |
| JP | H11-294983 A | 10/1999 | |
| JP | 2001-66081 A | 3/2001 | |
| JP | 2007-85672 A | 4/2007 | |
| WO | WO-03085329 A1 * | 10/2003 | ............ F24J 2/0483 |
| WO | WO-2007052158 A2 * | 5/2007 | ............ F24J 2/4621 |
| WO | 2012114229 | 8/2012 | |
| WO | WO 2012/140015 A1 | 10/2012 | |
| WO | WO 2015/129456 A1 | 9/2015 | |

OTHER PUBLICATIONS

McCormick, U.S. Appl. No. 17/823,073, filed Aug. 29, 2022.
McCormick, U.S. Appl. No. 17/093,063, filed Nov. 9, 2020.
McCormick, U.S. Appl. No. 17/012,621, filed Sep. 4, 2020.
McCormick, U.S. Appl. No. 16/945,281, filed Jul. 31, 2020.
McCormick, U.S. Appl. No. 16/928,352, filed Jul. 14, 2020.
American Heritage Dictionary, 2nd Edition (1984), at p. 573.
Bernal, "The Structure of Graphite," Proceedings of the Royal Society of London. Series A, Containing Papers of a Mathematical and Physical Character, vol. 106, Issue 740, at pp. 749-773 (1924).
Bodzenta, "Thermal Properties of Compressed Expanded Graphite: Photothermal Measurements," Appl Phys B 105:623-630 (2011).
Brown, "Sodium Silicate Bonded Sand," Foseco Ferrous Foundryman's Handbook (Eleventh Edition), pp. 204-215 (2000).
McEnaney, "Structure and Bonding in Carbon Materials," in Carbon Materials for Advanced Technologies (1999).
U.S. Appl. No. 16/928,352, filed Jul. 14, 2020, Multi-Temperature Heat Pump for Thermal Energy Storage.
U.S. Appl. No. 16/945,281, filed Jul. 31, 2020, Thermal Energy Storage and Retrieval Systems and Methods.
U.S. Appl. No. 17/012,621, filed Sep. 4, 2020, Thermal Energy Storage and Retrieval System.
Search Report and the Written Opinion dated Nov. 5, 2021 in PCT/US2021/039289.
International Search Report issued on Dec. 8, 2021 for PCT/US21/39288, 7 pages.
International Search Report issued on Dec. 14, 2021 for PCT/US21/39290, 20 pages.
Chemistry and Physics of Carbon, v. 1, Editor: Peter Thrower, Publ: Marcel Dekker, Inc. (1989) pp. 1-6.
Encyclopedic Dictionary of Condensed Matter Physics, v. 1, Charles P. Poole, Elsevier Ltd. (2004), pp. 530-533.
The Physical Chemistry of Materials—Energy and Environmental Applications (2010), Roque-Malherbe, CRC Press. pp. 86-88.
The Structure and Properties of Artificial and Natural Graphite, Neubert, et al, Argonne National Laboratory (1955) pp. 18-24.
"Designing a novel solar-assisted heat pump system with modification of a thermal energy storage unit", Proceedings of the Institution of Mechanical Engineers Part A Journal of Power and Energy, May 2019.

(56) References Cited

OTHER PUBLICATIONS

"Using Sand and other Small Grained Materials as Heat Storage Medium in a Packed Bed HTTESS", Schlipf et al., Energy Procedia, v. 69, pp. 1029-1038 (2015).

"The Rayleigh-Benard problem in extremely confined geometries with and without the Soret effect," Platten et al., Comptes Rendus Mecanique, Elsevier Masson, 2007, 335 (9-10), pp. 638-654.10. 1016/j.crme.2007.08.011.hal-01946148.

\* cited by examiner

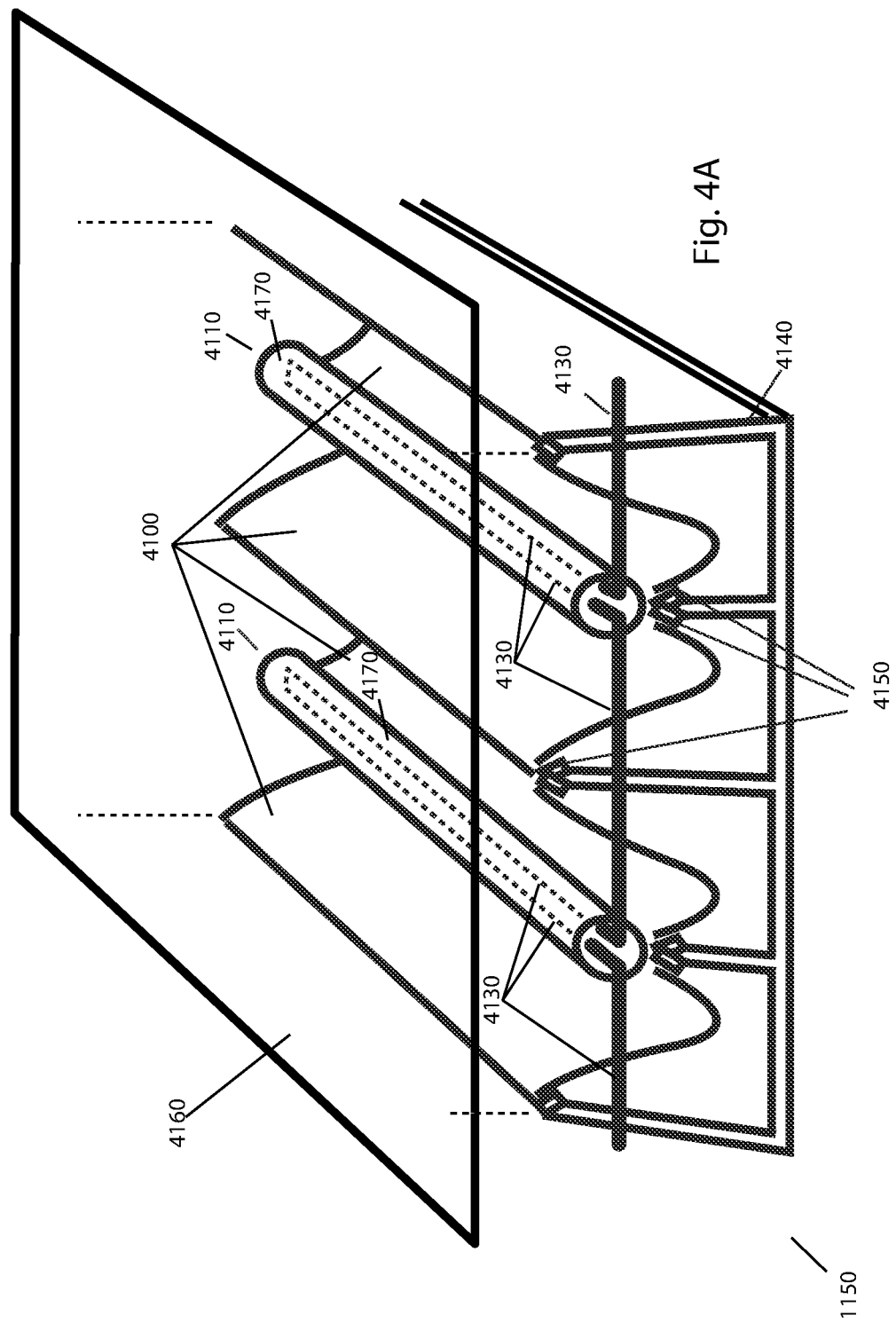

MULTI-TEMPERATURE HEAT COLLECTION SYSTEM

BACKGROUND OF THE INVENTION

The invention relates to a multi-temperature heat collection system. It has application in collection of solar heat—as well as, in some aspects, the dissipation of heat, whether collected from solar or otherwise.

Solar energy is a key part of the energy supply. Photovoltaic technology has proven to be both an inexpensive and a durable means of converting that energy to electrical. However, electrical energy from photovoltaics is not easily stored and some energy demand requires thermal, rather than electrical, energy. Collecting solar energy directly as thermal energy enables easy storage and integration into process heating requirements.

However, solar thermal energy collection has proven to be far less economical than electrical energy collection. High temperatures, complex tracking and focusing systems, and environmental stress increase the complexity, material costs and labor to deploy these systems. Mirror-based systems are commonly used in this regard. To ensure effectiveness as the sun moves across the sky, these systems require solar tracking mechanisms, which can be difficult to install and maintain. Moreover, the mirrors are limited in their concentration ratios and are prone to corrosion, which decreases their ability to focus the full power of incoming sunlight onto absorbers that collect the sun's heat energy. Existing flat-plate systems can be less complex and inexpensive to maintain; however, costs still keep them out of reach of many users. Flat-plate and other systems that rely on solar thermal tubes can be less expensive, but they have typically been limited to lower temperature applications using water as a heat transfer fluid. Where alternatives to water are used, such as flooding with higher temperature fluids, costs of these systems and the attendant heat pipe technology can be cost-prohibitive.

Objects of the invention are to provide improved systems and methods for heat collection that are applicable, for example, in collecting solar energy.

Other objects are to provide such improved systems and methods for dissipating heat, whether in connection with solar energy collection or otherwise.

Still other objects of the invention are to provide such systems and methods as can deliver workable economics for solar energy collection and thus enable, by way of example, storage and process heating applications.

Yet still further objects of the invention provide such systems and methods as permit economically efficient collection of solar thermal energy, e.g., using a solar tube collector.

SUMMARY OF THE INVENTION

Dual Solar Collector System

The foregoing are among the objects attained by the invention, which provides in some aspects a thermal energy collection system comprising a first solar collector through which a first heat transfer fluid flows to absorb energy from sunlight as it passes through the first solar collector, and a second solar collector that collects energy from sunlight that has passed through the first solar collector. The first heat transfer fluid of the thermal energy collection system according to these aspects of the invention is in thermal coupling with the first solar collector, but not with the second solar collector.

Related aspects of the invention provide a thermal energy collection system, e.g., as described above, in which the first solar collector is separated from the second solar collector by at least an air gap. In other related aspects of the invention, the first and second solar collectors comprise respective external housings, which are separated or separable from one another.

Other related aspects of the invention provide a thermal energy collection system, e.g., as described above, wherein the first solar collector—which can include, for example, a UV-light absorbing layer on one of its faces (e.g., to absorb UV-light from sunlight impinging on the first collector from above)—absorbs longwave radiation emitted (e.g., from below) by the second solar collector.

Still other related aspects of the invention provide a thermal energy collection system, e.g., as described above, wherein the first solar panel comprises a multi-wall panel, an interior of which is in fluid coupling with, and that forms part of, a fluid circuit through which the first heat transfer fluid flows. The multi-wall panel can be, according to related aspects of the invention, a multi-wall polycarbonate panel.

Still other aspects of the invention provide a thermal energy collection system, e.g., as described above, wherein the fluid circuit is in valve-actuated fluid coupling with a reservoir of dye which, when the dye is released from said reservoir into the fluid circuit for flow through the first solar collector, at least partially prevents sunlight from passing through the first solar collector. That dye can, according to related aspects of the invention, color the first heat transfer fluid in order to increase its absorption of energy in at least one of the visible and infrared spectra.

Further aspects of the invention provide a thermal energy collection system, e.g., as described above, wherein the fluid circuit includes a heat exchanger that provides indirect thermal coupling between the first heat transfer fluid and a low temperature heat source. That fluid circuit can include, according to related aspects of the invention, one or more pumps and/or valves operable to direct the first heat transfer fluid through the heat exchanger to (i) transfer thermal energy absorbed by the first heat transfer fluid in the first solar collector to the low temperature heat source or, alternatively, (ii) transfer heat from the low temperature heat source to the first heat transfer fluid for dissipation via the first solar collector.

Other related aspects of the invention provide a thermal energy collection system, e.g., as described above, wherein the low temperature energy source is a heat pump.

The multi-wall panel can, according to related aspects of the invention, comprise a plurality of internal channels that run parallel to a direction of flow of the first heat transfer fluid through the first solar collector. And that panel can, according to other related aspects of the invention, be formed by extrusion.

Still other related aspects of the invention provide a thermal energy collection system, e.g., as described above, wherein the second solar collector comprises a thermally conductive via through which a second heat transfer fluid flows and a reflective film that reflects and concentrates the sunlight onto the thermally conductive via. That film can, according to related aspects of the invention, hang from a frame that forms part of the second solar collector. Moreover, the frame can include, according to other aspects of the invention, one or more supports that constrain a slope of the film.

According to related aspects of the invention, the aforesaid via comprises a thermally conductive outer shell, a duct that is disposed within the outer shell and through which the second heat transfer fluid flows, and expanded graphite that is disposed between the outer shell and the duct. According to related aspects of the invention, the expanded graphite is compressed, and the duct comprises stainless-steel tubing.

Still other aspects of the invention provide a thermal energy collection system, e.g., as described above, wherein the second solar collector comprises any of a solar photovoltaic cell, a solar thermal flat plate collector, and a parabolic solar concentrator.

Radiator+Solar Collector

In other aspects, the invention provides a radiator system, comprising a multi-wall panel, an interior of which is in fluid coupling with, and that forms part of, a fluid circuit through which a first heat transfer fluid flows. A first face of the multi-wall panel transfers thermal energy from the heat transfer fluid into an ambient environment. A reflective surface is disposed in a vicinity of a second face of the multi-wall panel.

Related aspects of the invention provide a radiator system, e.g., as described above, wherein the first and second faces of the multi-wall panel are opposing faces of that panel. The first such face can be, according to related aspects of the invention, skyward-facing and the second such face can be earthward-facing.

According to related aspects of the invention, there is provided a radiator system, e.g., as described above, in which the reflective surface reflects radiant energy incident thereupon—e.g., after having passed through the multi-wall panel—back toward the multi-wall panel. That panel can be, according to related aspects of the invention a multi-wall polycarbonate panel formed by extrusion or otherwise that includes, e.g., a plurality of internal channels that run parallel to a direction of flow of the first heat transfer fluid through the panel.

Further aspects of the invention provide a radiator system, e.g., as described above, wherein the fluid circuit is thermally coupled to a low temperature heat source such as, for example, a heat pump. That fluid circuit can include, according to related aspects of the invention, a heat exchanger that provides indirect thermal coupling between the first heat transfer fluid and the low temperature heat source.

Still other aspects of the invention provide a thermal energy collection system comprising a radiator system, e.g., as described above. In such a thermal energy collection system, the multi-wall panel can serve as a first solar collector through which the first heat transfer fluid flows to absorb energy from sunlight passing through the panel. And, the fluid circuit can be thermally coupled to a low temperature heat source—e.g., a heat pump—and operable to direct the first heat transfer fluid so as to dissipate heat from the low temperature heat source via the first solar collector.

According to related aspects of the invention, the fluid circuit of a thermal energy collection system, e.g., as described above, can include a heat exchanger that provides indirect thermal coupling between the first heat transfer fluid and the low temperature heat source. That fluid circuit can be operable, according to related aspects of the invention, to direct the first heat transfer fluid through the heat exchanger to transfer heat from the low temperature heat source to the first heat transfer fluid for dissipation via the first solar collector.

According to related aspects, the invention provides a thermal energy collection system, e.g., as described above, wherein the fluid circuit is operable to transfer thermal energy absorbed by the first heat transfer fluid in the first solar collector to the low temperature heat source or, alternatively, to dissipate heat from the low temperature heat source via the first solar collector.

In still other aspects, the invention provides a thermal energy collector, e.g., as described above, comprising a reflective film disposed to prevent thermal energy contained within and/or passing through the first solar collector from warming a ground or other substrate over which that solar collector is disposed. That reflective film can, according to related aspects of the invention, prevent sunlight that passes through the first solar collector from warming the ground or other substrate over which that solar collector is disposed.

According to still other related aspects of the invention, that reflective film can form part of a second solar collector that includes a thermally conductive via through which a second heat transfer fluid flows, and wherein the reflective film is disposed to reflect and concentrate the sunlight that passes through the first solar collector onto the thermally conductive via.

Reflective Film Energy Collector

In other aspects, the invention provides a solar energy collection system comprising a thermal energy absorber, a reflective film that reflects and concentrates sunlight onto the thermal energy absorber, a frame on which the film is disposed and from which it hangs, and a cover that is substantially transparent in at least one of the visible and infrared spectra and that is disposed in vicinity of the frame to minimize adverse environmental effects on the film. Supports provided in the frame can, according to related aspects of the invention, constrain a slope of the film.

Related aspects of the invention provide a solar energy collection system, e.g., as described above, wherein the thermal energy absorber comprises a thermally conductive via through which a heat transfer fluid flows, the reflective film being disposed to reflect and concentrate sunlight onto the thermally conductive via.

That via can, according to related aspects of the invention, comprise a thermally conductive outer shell, a duct that is disposed within the outer shell and through which the heat transfer fluid flows, and expanded graphite that is disposed between the outer shell and the duct. The expanded graphite can be, according to related aspects of the invention, compressed, and the duct can comprise stainless-steel.

Solar Energy Absorber With Expanded Graphite

Other aspects of the invention provide a solar energy absorber comprising one or more thermally conductive outer shells adapted to receive solar energy, a duct that is disposed within and traverses one or more of the outer shells and through which duct a heat transfer fluid flows, and expanded graphite that is disposed between at least one of the outer shells and the duct.

Related aspects of the invention provide an improved solar energy absorber, e.g., as described above, wherein at least one of the outer shells is adapted to receive reflected sunlight, the expanded graphite is compressed and/or the duct comprises stainless-steel tubing.

Still other related aspects of the invention provide an improved solar energy absorber, e.g., as described above, comprising a plurality of said outer shells spaced apart from one another.

Yet still other related aspects of the invention provide an improved solar energy absorber, e.g., as described above, wherein the duct is bent or otherwise shaped to traverse a plurality of said outer shells.

In still other related aspects of the invention, the invention provides an improved solar energy absorber, e.g., as described above, wherein at least one of the outer shells comprises a tube.

Solar Energy Flat Plate Absorber With Expanded Graphite

In yet still other aspects, the invention provides a solar energy absorber comprising a flat plate, a duct for carrying a flow of heat transfer fluid, and a layer of compressed expanded graphite in thermal conduct with both the duct and with the flat plate to absorb thermal energy from the plate and conduct it to the duct.

The foregoing and other aspects of the invention are evident in the text that follows and in the drawings.

BRIEF DESCRIPTION OF THE DRAWINGS

A more complete understanding of the invention may be attained by reference to the drawings, in which:

FIG. 4A is a perspective view of a reflective film energy solar thermal collector according to the invention;

DETAILED DESCRIPTION OF THE ILLUSTRATED EMBODIMENT

Dual Solar Collector System

Figure 1:
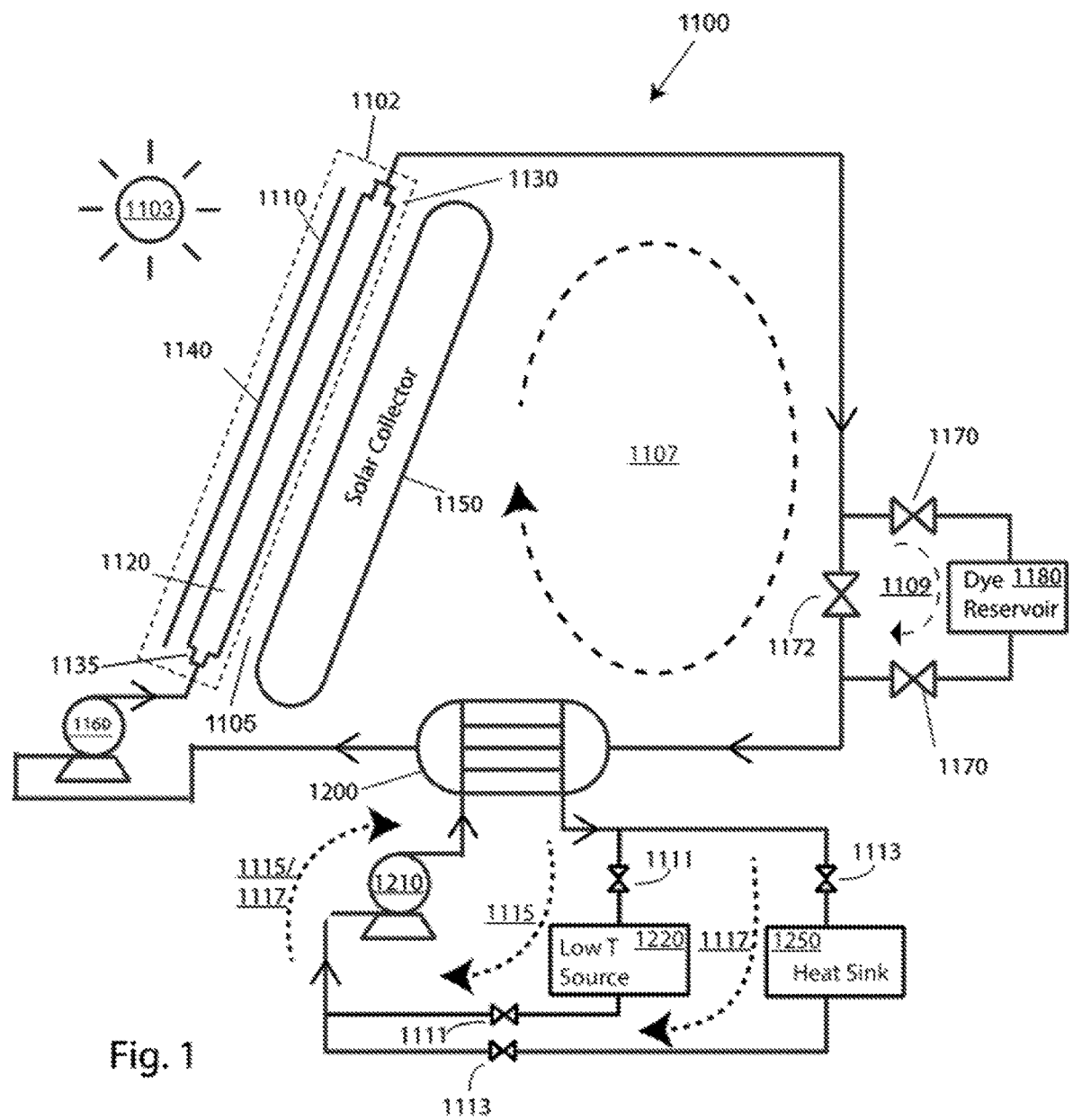
FIG. 1 depicts a dual solar collector system according to one practice of the invention.

FIG. 1 depicts a dual solar collector system 1100 according to one practice of the invention. The system comprises a first solar collector 1102 and a second solar collector 1150 arranged as shown in the drawing, with the first collector disposed between the sun 1103 and the second collector 1150. In some embodiments, the first and/or second collectors 1102, 1150 are equipped with solar tracking mechanisms, not shown, of the type known in the art to assure their respective positions vis-à-vis the sun as it travels through the sky.

The first collector 1102, which can be largely transparent to visible and/or infrared light, collects thermal energy from sunlight passing through it. In the illustrated embodiment, that collector 1102 comprises a multi-wall panel, as discussed below, the interior of which is in fluid coupling with, and that forms part of, a fluid circuit through which a heat transfer fluid flows. That circuit is represented by dashed lines 1107, as discussed below.

In addition to absorbing thermal energy from the sun, the first collector 1102 of some embodiments absorbs long-wave (i.e., infrared) radiation emitted by the second solar collector—e.g., radiation that might otherwise be lost to the atmosphere. As discussed below, the collector 1102 can also, in some modes of operation of system 1100, function to dissipate heat into the environment, i.e., rather than absorbing it.

The second solar collector 1150 collects energy from sunlight that has passed through the first solar collector. It can comprise any of a solar photovoltaic cell, a solar thermal flat plate collector, a parabolic solar concentrator, or other solar collector of the type known in the art as adapted in accord with the teachings hereof. In the illustrated embodiment, the second collector 1150 comprises a "high-temperature" solar concentrator-type collector of the type discussed in connection with FIGS. 3-4B, below. As discussed below, this comprises a solar tube to collect high temperature thermal energy and a compound reflector to concentrate solar radiation to generate those high temperatures.

The first and second collectors 1102, 1150 of some embodiments of the invention comprise separate and/or separable solar collectors (i.e., solar collectors that can operate independently of one another). Thus, for example, although the aforementioned heat transfer fluid is in thermal coupling with the first solar collector 1102; it is not in thermal coupling with the second collector 1150. Moreover, there can be an air gap 1105 between the respective collectors 1102, 1150, as shown. Still further, the first and second solar collectors 1102 and 1150 may have their own external housings, which are separated or separable from one another; although, those housings (not shown) may be mechanically coupled by a frame or otherwise, to help insure their relative positioning, e.g., vis-à-vis the sun 1103. Other embodiments may vary in any or all of these regards.

One advantage of the solar thermal energy collection system 1100 is that it integrates three capabilities that extend the utility and improve the economics of the system as a whole. In addition to operational modes in which it absorbs heat and dissipates heat, the low-temperature collector 1102 can utilize dyes as discussed below to "deactivate" the high-temperature collector 1150 by blocking the transmission of sunlight to it.

Thus, for example, in embodiments that employ a high-temperature collector 1150 as described above, this enables the collection of moderately high temperature thermal energy (200° C. to 300° C. or more, depending in implementation). While this is lower than some concentrated solar power systems, embodiments illustrated here achieves this objective with minimal capital cost—an advantage that is enhanced in embodiments that utilize U-shaped solar tubes and/or those filled with expanded graphite as discussed below, e.g., in connection with FIGS. 3-4B.

Multi-Wall Panel Collector and Radiator

Moreover, the "low-temperature collector," i.e., the multi-wall flat plate collector 1102 adds, the capability to withdraw additional thermal energy from the sun by capturing heat near ambient temperature—either above or below ambient. This additional heat can be used, for example, in a heat pump to produce higher temperature heat. Moreover, with the addition of transparent insulating layers, the heat captured by the low-temperature collector can be at even higher temperatures (40° C. to 100°+C) with minimal impact on the high temperature collector.

The multi-wall low-temperature collector 1102 of the illustrated embodiment, moreover, can be used as a radiator to dissipate heat collected by the illustrated system and/or by downstream apparatus (such as, for example, heat engine 1220) to which it is coupled. In cases where heat collected by the collector is consumed in heat engines to generate mechanical work this is particularly important because those systems ultimately have to dissipate a substantial fraction of the heat energy they consume.

Referring to the embodiment illustrated in FIG. 1, the sun 1103 emits radiation that passes through low-temperature collector 1102. In the illustrated embodiment, that collector, which is generally of a flat plate-type design, comprises a twin-wall polycarbonate panel 1120 of the type commercially available in the marketplace. Other embodiments may employ multi-wall panels having a greater number of walls and/or fabricated from other materials (e.g., plastics, glasses, and so forth) that are substantially transparent to sunlight in the visible and/or infrared spectra and that pass at least a portion of that spectrum/spectra to collector 1150 for absorption and/or conversion by it. The degree and spectra of transmissivity is implementation-specific, and its selection is within the ken of those skilled in the art depending on the characteristics of the collector 1150 (to which collector 1102 passes sunlight) and on the respective portions of that spectra to be absorbed/converted by collectors 1102 and 1150.

Multi-wall panel 1120 of the illustrated embodiment includes a layer on (at least) its sunward-facing surface to absorb impinging UV solar radiation. In the illustrated embodiment, this is effected by a film 1110 is attached to the twin-wall polycarbonate panel 1120 with an acrylic adhesive 1140, e.g., that activates through the application of compressive force or otherwise and that is transparent to visible and near infrared radiation.

That film can be, for example, a polyvinyl fluoride film with ultraviolet inhibitors, though, other UV inhibitors known in the art, whether applied to the panel 1120 as films or otherwise, may be used instead or in addition. This film provides a protective layer that increases the life of the system 1100 by filtering out the ultraviolet (UV) radiation while still transmitting the visible and infrared radiation that carries the bulk of the solar energy. The film also provides a surface that resists degradation in the environment from sand, wind, and dirt. Other candidate materials for the film include, but are not limited to, polyvinylene difluoride (PVDF), fluorinated ethylene propylene (FEP), perfluoroalkoxy alkane (PFA), ethylene tetrafluoroethylene (ETFE), superhydrophobic silica nanoparticle films and glass. It is also possible to use the panel 1102 without a film and to rely solely on ultraviolet inhibitors in the twin-wall polycarbonate or other multi-wall panel composition.

The twin-wall polycarbonate or other multi-wall panel 1102, which can be formed by extrusion or otherwise, contains a plurality of internal parallel channels (e.g., as illustrated by parallel vias of element 1120a of FIG. 2A) that provide both enhanced structural strength and that serve as a conduit for the heat transfer fluid. In the illustrated embodiment, that fluid is water, although, other fluids the selection of which is within the ken of those skilled in the art may be used instead or in addition. Headers 1130 and 1135 provide an inlet and outlet, respectively, for that fluid and distribute it to the channels of the polycarbonate/multiwall panel 1102 and consolidate the flow from them, respectively.

Flow Paths in the Dual Solar Collector System

Headers 1130, 1135 are coupled by vias, piping, conduits, tubing (here, collectively, "tubes"), valves, pumps and other structures of the type known in the art suitable for defining fluid flow paths (or circuits) for carrying heat transfer fluids as illustrated in the drawings and described below. Those tubes are depicted by solid lines and directional arrows in the drawing, as per convention. The valves and pumps are depicted by corresponding conventional icons.

Referring to FIG. 1, a first fluid flow path 1107 is defined by the illustrated tubes, valves and pumps, when valves 1170 are closed, valve 1172 is open and pump 1160 is running. This is a flow path that includes pump 1160, inlet header 1135, the channels of panel 1120, outlet header 1130, valve 1172, and heat exchanger 1200. That exchanger 1200 provides indirect thermal coupling between the heat transfer fluid in flow path 1107 and that in flow paths 1115, 1117 of either a low-temperature heat source 1220 (e.g., a heat pump) or a heat sink 1250, respectively.

When valve 1172 is closed and valves 1170 are opened, the first fluid flow path 1107 extends to include a second fluid flow path 1109, which includes valves 1170 and dye reservoir 1180.

The heat exchanger 1200 includes internal tubing that simultaneously carries fluids of (and form part of) two fluid flow paths—here, referred to as a primary and second flow paths for convenience—travelling in counter-current directions to maximize heat transfer. The heat exchanger 1200 of the illustrated embodiment is of the shell and tube variety. Other heat exchanger technologies may be used instead, based on the desired operating conditions. This includes, but are not limited to, brazed plate heat exchangers, spiral tube heat exchangers, and direct contact heat exchangers.

In the illustrated embodiment, the exchanger's primary flow path is flow path 1107 (optionally, in combination with path 1109), carrying heat transfer fluid utilized in multi-wall panel 1120 (e.g., water).

The exchanger's secondary flow path is, depending on the arrangement of the valves 1111 and 1113, either flow path 1115 or 1117, both carrying a common working fluid such as isobutane. More particularly, if valves 1111 are open, valves 1113 are closed and pump 1210 is running, the secondary flow path is fluid flow path 1115, including valves 1111, low temperatures source 1220 (e.g., a heat pump) and pump 1210. On the other hand, if valves 1111 are closed, valves 1113 are open and pump 1210 is running, the secondary flow path is fluid flow path 1117, including valves 1113, heat sink 1250 and pump 1210.

Operation of the Dual Solar Collector System

The pumps and valves of illustrated in the drawing are of the conventional variety known in the art. They and the other active components of system 1100 may be operated to effect solar heat absorption, heat dissipation and "deactivation" cycles, as described below and elsewhere herein. Such operation may be "by hand" by an operator (not illustrated), by machine, e.g., by a digital data processor, PLC or other control devices or combination thereof (not illustrated), or by a combination of man and machine, all as per convention in the art as adapted in accord with the teachings hereof.

Thus, for example, in a solar heat absorption cycle, fluid flow paths 1107 and 1117 are activated by closing valves 1170, opening valve 1172, and activating pump (for flow path 1107) and by closing valves 1111, opening valves 1113, and activating pump 1210 (for flow path 1117). This cycle is typically run during the day, when sunlight passing through panel 1120 (as well as longwave radiation emitted by the second solar collector 1150 and otherwise present in the environment of panel 1120) warms the heat transfer fluid in flow path 1107 as it passes through the panel 1120. As the warmed fluid travels that path 1107 and passes through unit 1200 it exchanges heat with the working fluid of flow path 1117, which working fluid continues along that flow path 1117 to a low temperature heat sink 1250 of the type known in the art, e.g., by way of non-limiting example, a thermal storage system that consumes isobutane in the gas phase and returns it to the system predominately in the liquid phase. Solar collector 1150 can be operational during the above-described heat absorption cycle to convert or absorb solar energy that has passed through the panel 1120.

In the heat dissapation cycle, fluid flow paths 1107 and 1115 are activated by closing valves 1170, opening valve 1172, and activating pump (for flow path 1107) and by closing valves 1113, opening valves 111, and activating pump 1210 (for flow path 1115). This cycle is run to dissapate heat from a heat pump or other low temperature source 1220, typically, during the nighttime and early morning hours before the temperature of the panel 1120 reaches its daytime high.

Working fluid warmed by the source 1220 in flow path 1115 exchanges heat with the heat transfer fluid in exchanger 1200. The warmed heat transfer fluid travels along flow path 1107 to the panel 1120, where it gives up the excess thermal energy to the ambient environment, e.g., via it's sunward-facing face.

This can be facilitated in embodiments in which the earthward-facing face of the panel 1120 (which, in the illustrated embodiment, opposes the sunward-facing face of the panel 1120) is disposed adjacent a reflective surface. This can be, for example, the reflective film of solar collector 1150 described below, e.g., in connection with FIG. 4A. Alternatively, some embodiments of the panel 1120 employ a reflective film, sheet, panel or other structure to reflect radiant energy back toward the multi-wall panel. Such a film, sheet or panel can be affixed to the earthward-facing face of panel 1120 or to frame 1140 in a vicinity of the panel 1120, all by way of non-limiting example.

Although of potentially limited utility, solar collector 1150 can be operational during the heat dissipation cycle to convert or absorb solar energy that has passed through the panel 1120.

At times, it may be desirable to interrupt the flow of thermal energy into the solar collector 1150. This may be needed, for example, during maintenance activities. In the deactivation cycle, the first fluid flow path 1107 is extended to include a second fluid flow path 1109 by closing valve 1172 and opening valves 1170, while pump 1160 is running. This causes dye reservoir 1180 to supply a colorant to the heat transfer fluid in flow paths 1107/1109. This colorant will increase the absorption of that fluid in the visible and infrared spectrum. When it flows through the panel 1120, solar energy in the visible and/or infrared reaching panel 1120 is absorbed by the colored heat transfer fluid (rather than passing through it on its way to collector 1150). This reduces substantially the energy reaching the solar collector 1150. In the preferred embodiment, the dye reservoir is a combination of one or more water soluble food coloring additives including FD&C Blue No. 1, FD&C Blue No. 2, FD&C Green No. 3, FD&C Red No. 3, FD&C Red No. 40, FD&C Yellow No. 5, and FD&C Yellow No. 6.

When it is desired to return the system to normal operation, valves 1170 are closed and valve 1172 is re-opened. The heat transfer fluid with the dye is either removed from the system 1170 ("by hand" or otherwise) and replaced with clear working fluid or the dye is removed from the heat transfer fluid, e.g., by filtering or chemical neutralization or otherwise. In the preferred embodiment, the dyed heat transfer fluid is replaced with fresh water.

Multi-Wall Panel Fabrication

Figure 2A:
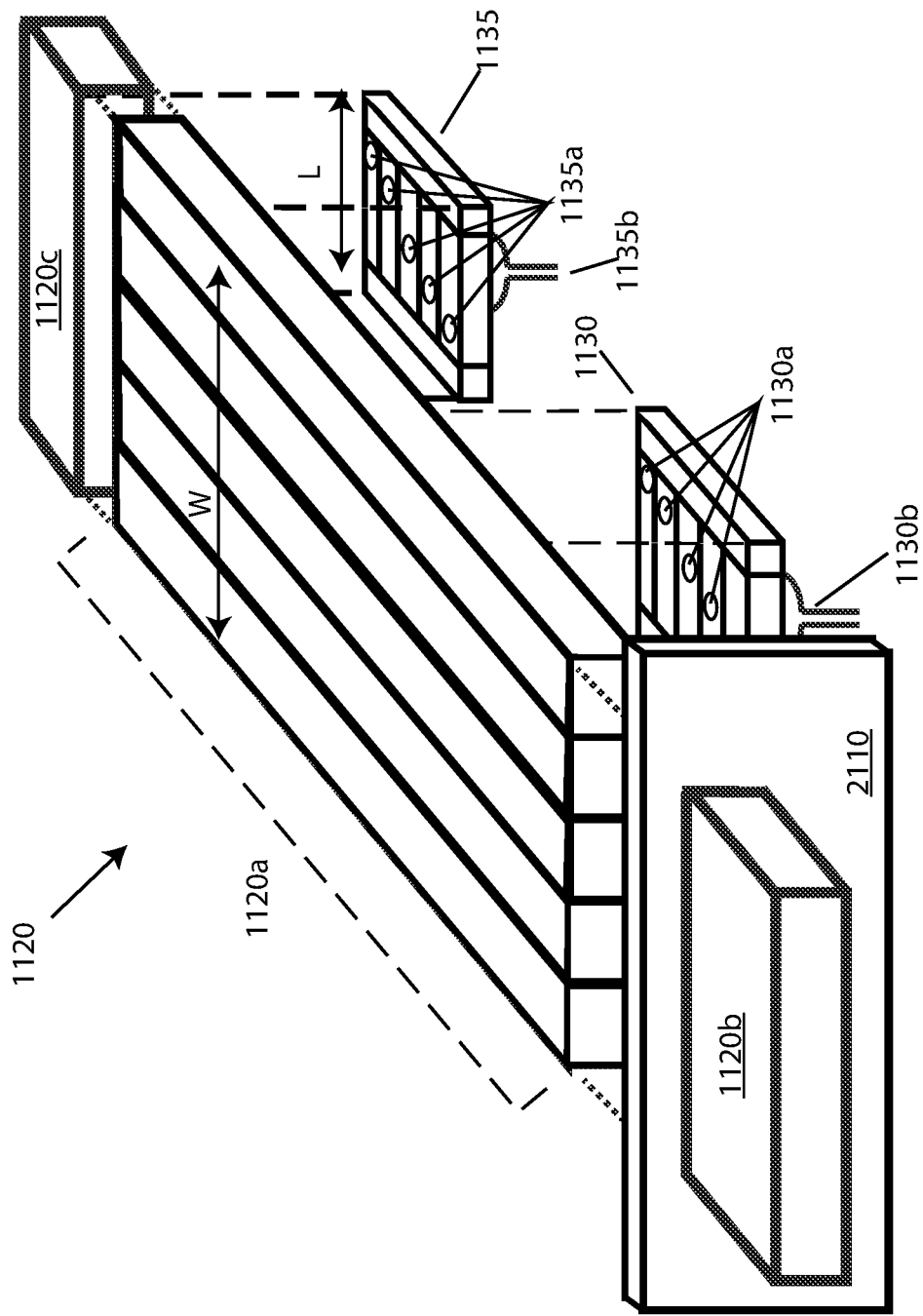
FIG. 2A is a perspective view of a multi-wall panel of the system of FIG. 1 that reflects aspects of its construction.

Further details of the multi-wall panel 1120 and its headers 1130, 1135 according to one embodiment of the invention are depicted in FIG. 2A. This is by way of non-limiting example: the panel and/or its headers may be fabricated in other manners within the ken of those skilled in the art in view of the teachings hereof.

Illustrated panel 1120 includes body 1120a, and caps 1120b and 1120c disposed at proximal and distal ends, respectively, of the body 1120a, as shown. Body 1120a and proximal cap 1120b of the illustrated embodiment are formed together, as a unit, by extrusion of a block of stock (e.g., polycarbonate) through die 2110 to form body 1120a. A portion of the stock that is not pushed through the die remains attached to extruded body and forms cap 1120b. A further piece of stock is affixed by adhesive, ultrasonic welding or otherwise to form cap 1120c.

Panel 1120 so formed can range in size from 3' in length, or less, to 9' in length, or more, depending on needs and available resources. Likewise, the panel can range in width from 1.5', or less, to 3', or more, again depending on needs and resources. Channels in the panel can range from ¹⁄₆₄ sq. in. in cross section, or less, to 1 sq. in, or more, again, depending on needs and resources.

Formation of the panel 1120 as so described is within the ken of those skilled in the art in view of the teachings hereof, as are other methods for forming a multiwall panel 1120.

Figure 2B:
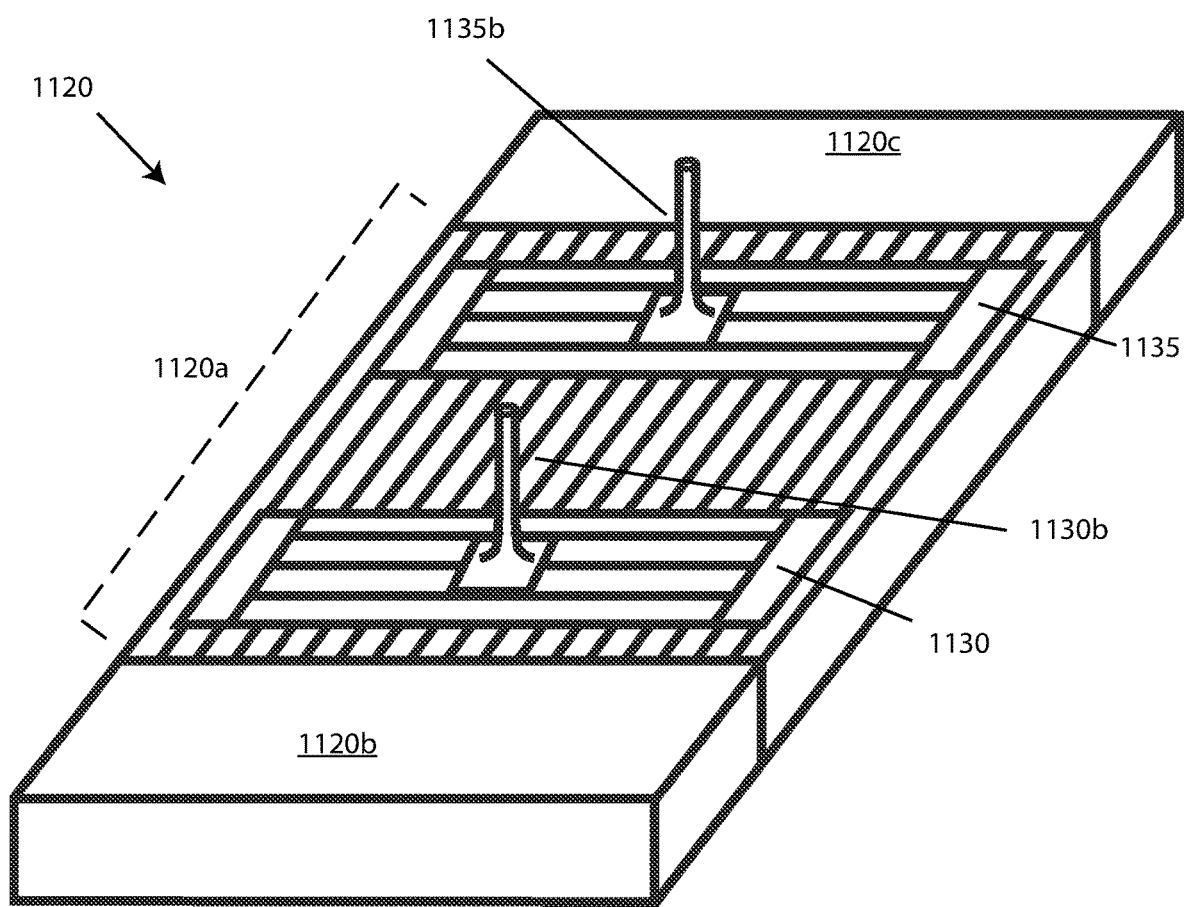
FIG. 2B is a perspective view of an underside of the multi-wall panel of FIG. 2A.

Illustrated headers 1130 and 1135 can be formed identically to multiwall panel 1120, though, as shown in the drawing, the headers 1130, 1135 are formed so that their lengths, L, approximate (or is less than) the width, W, of the panel 1120, as shown—though, again this depends on needs and resources. The headers 1130, 1135, are formed or otherwise equipped with apertures 1130a, 1135a which permit fluid coupling with corresponding apertures (not shown) of the panel 1120, once the headers are affixed to the underside of (or other location on) the panel 1120, e.g., by adhesive, welding or otherwise. The headers are also equipped with adapters 1130b, 1135b, as shown, that support fluid coupling between tubing forming flow path 1107 and the respective headers 1130, 1135 and, thereby, panel 1120. The underside of panel 1120, with headers 1130, 1135 so affixed, is shown in FIG. 2B.

Reflective Film Solar Energy Collector

Figure 4B:
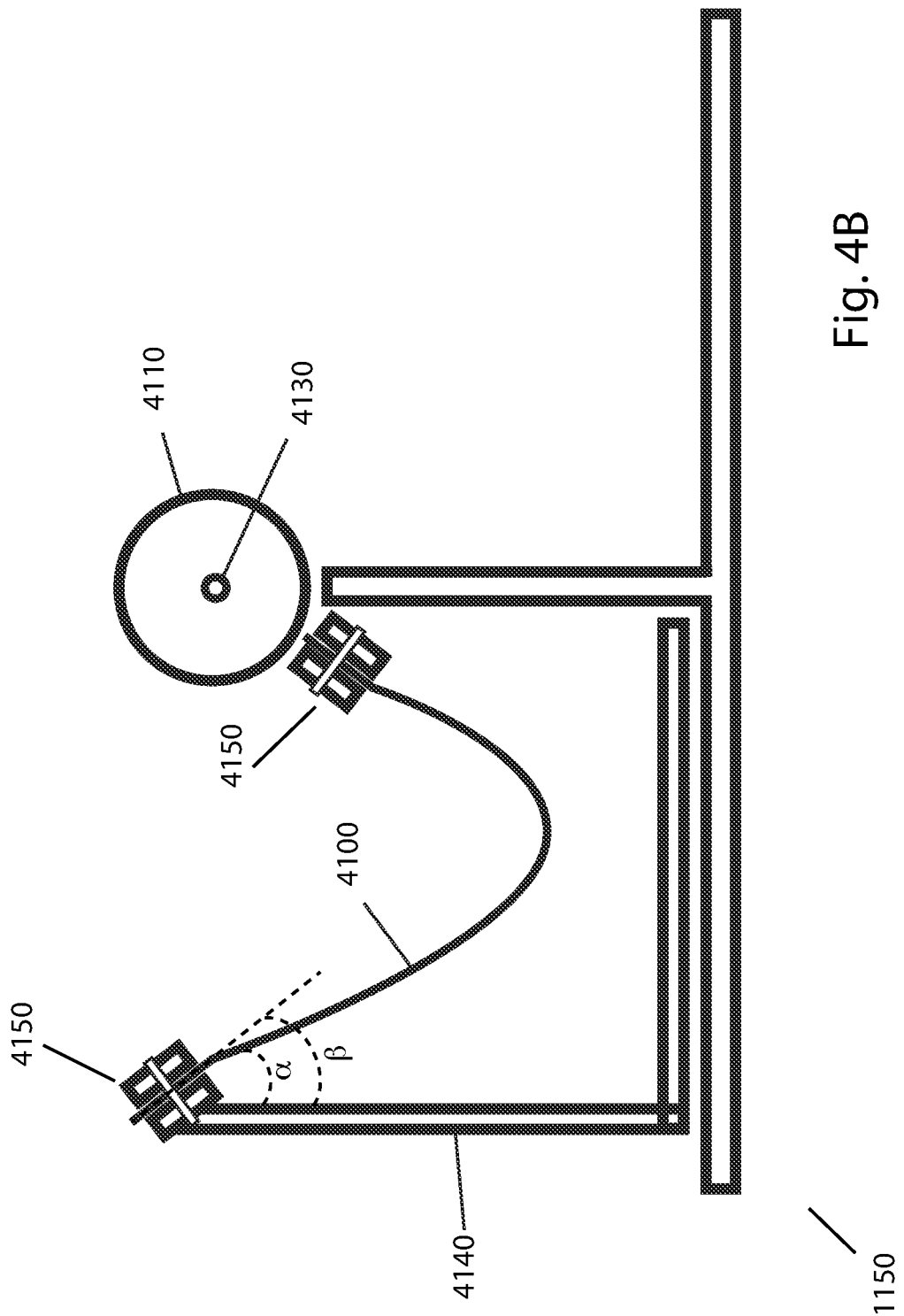
FIG. 4B is a side view of the solar thermal collector of FIG. 4A.

The solar collector 1150 of the illustrated embodiment is a solar thermal tube type collector as illustrated in perspective view in FIG. 4A and in side view in FIG. 4B. That collector comprises thermally conductive vias (or absorber) 4110 through which a heat transfer fluid flows—albeit on a separate fluid circuit than that of flow path 1107, 1115 and 1117 discussed above in connection with FIG. 1. The collector 1150 also includes a film 4100 that reflects and concentrates the sunlight—e.g., whether received directly or after having passed through panel 1120 or otherwise—onto the thermally conductive vias/absorber 4110a.

A cover 4160 that is substantially transparent in at least one of the visible and infrared spectra (and, in the illustrated embodiment, both) and, preferably, that blocks UV, is disposed in vicinity of attached to the frame (or otherwise disposed in its vicinity) to minimize adverse effects of wind, dust and other environmental effects on the film. The cover 4160 can comprise polycarbonate or other plastics, glasses, or other materials like those used in the multi-wall panel construction or otherwise, as is within the ken of those skilled in the art in view of the teachings hereof.

The reflective film 4100 hangs from a frame 4140 that forms part of the second solar collector 1150 and that includes support members 4150 that constrain the film and impart slope to it, e.g., depending on the angle of the support member, the extent of its contact with the film 4100a, and the stiffness of the film, among other factors within the ken of those skilled in the art in view of the teachings hereof.

The film 4100 comprises a metalized/reflective plastic, paper or other material suitable for hanging under the weight of gravity from frame 4140 and/or supports 4150 to attain a parabolic-like shape—and, more particularly, a catenary curve—in cross-section suitable for reflecting impinging sunlight and concentrating it onto absorber 4110. A single sheet of film 4100 may span the entire frame 4140 or multiple sheets may be employed, each hanging from a pair of supports 4150a, depending on resources and requirements of the installation.

The height and/or spacing of crossbars and other framing members that comprise frame 4140 may be adjusted to optimize the focus of the reflected sunlight onto the absorber 4110a. The angle and/or impingement points of the supports 4150 (which may comprise hinge-mounted blocks, gimbal-mounted blocks, or so forth) on the film 4100 may be adjusted for like purpose. Thus, for example, as shown in FIG. 4B, a slope $\alpha$ of the film 4100 in a vicinity of a mount is a function of its angle $\beta$ off vertical (here, represented by a framing member to which the illustrated support is mounted. The slope $\alpha$, which may impact the catenary curve cross-section of the film 4100, is as noted above a function of the angle of the support member $\beta$, the extent of its contact with the film 4100a, and the stiffness of the film, among other factors within the ken of those skilled in the art in view of the teachings hereof. The aforesaid framing members and/or supports may be adjusted and/or adjustable "by hand", motor or otherwise to improve focus and/or tracking throughout the day.

Solar Energy Absorber With Expanded Graphite

Figure 3:
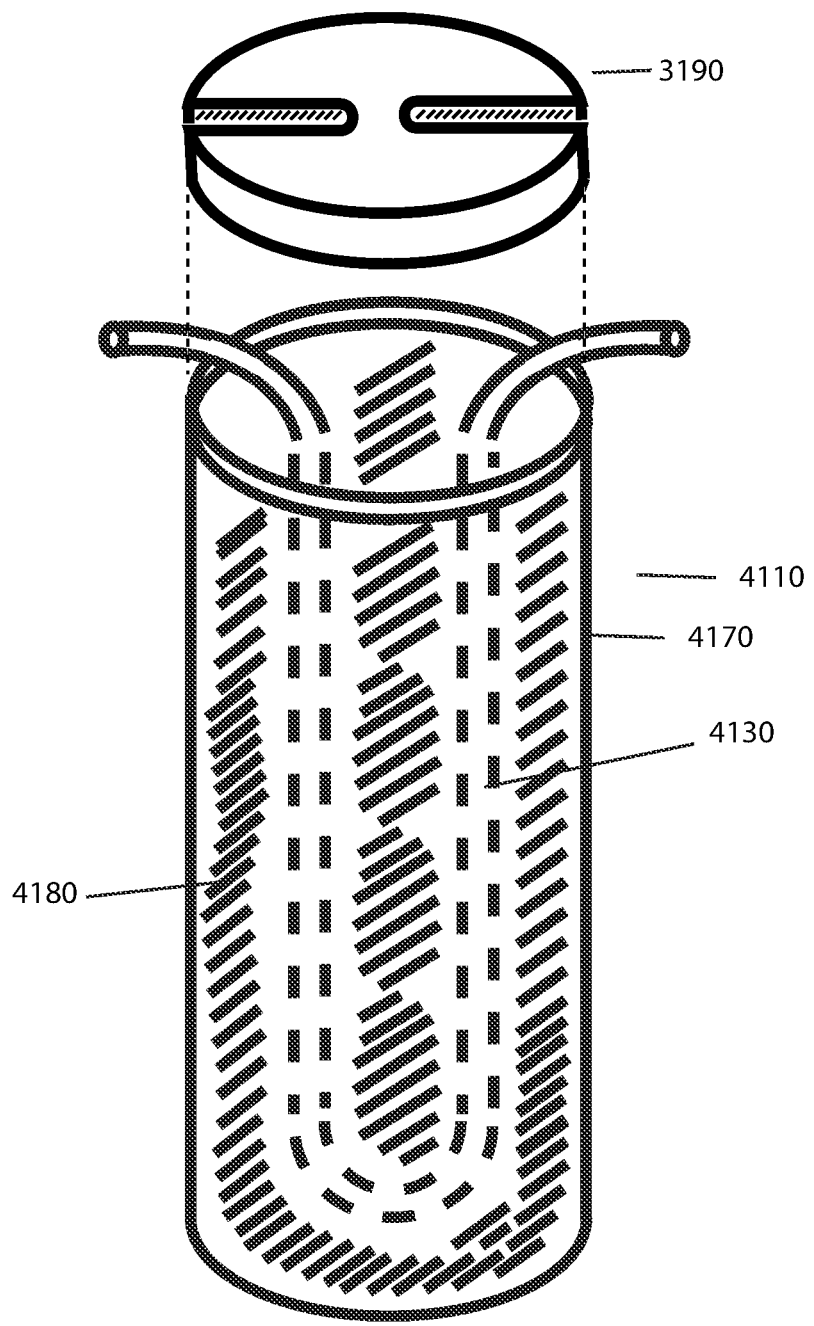
FIG. 3 shows the construction of a graphite filled solar thermal absorber according to the invention of the type used in the solar thermal collector of FIGS. 4A-4B.

FIG. 3 depicts the thermally conductive via 4110 that absorbs sunlight reflected by the film 4100 of solar collector 1150. The absorber 4110 comprises a vacuum insulated shell 4170 that receives the reflected sunlight and absorbs its heat with a selectively absorbing coating. Within the shell is disposed a duct 4130 through which a heat transfer fluid flows to carry away that heat. In the illustrated embodiment, graphite (and, preferably, compressed expanded graphite) 4180 is packed into the shell 4170 between its inner wall and the duct 4130 to conducts solar heat from the shell to the duct. Other embodiments of the invention may use materials other than graphite to carry heat from the shell to the duct. A cover 3190 to close the shell 4170 and adapted to accommodate the duct 4130 can be provided as shown.

Solar collector 1150 can employ a plurality of shells 4170: two that are spaced-apart from one another on respective regions of frame 4140 are shown in FIG. 4A, each absorbing sunlight reflected from a different portion of the collector. As shown in that drawing, a common duct 4170 (or, likewise, a plurality of ducts that are in fluid coupling with one another) can be shared by all of those shells of the illustrated embodiment; alternatively, each shell 4170 can be serviced by a different respective duct 4130. Where a common duct is used, it can be bent or otherwise U-shaped as shown in the drawing to traverse the plurality of shells 4170.

Shell 4130 can be fabricated from a light-absorbing thermal conductor, e.g., metal tubing covered with a black paint or other light-absorbing coating, of the type known in the art, and duct 4130 can be fabricated from stainless steel or other heat absorbing tubing—all is is within the ken of those skilled in the art in view of the teachings hereof.

Figure 5:
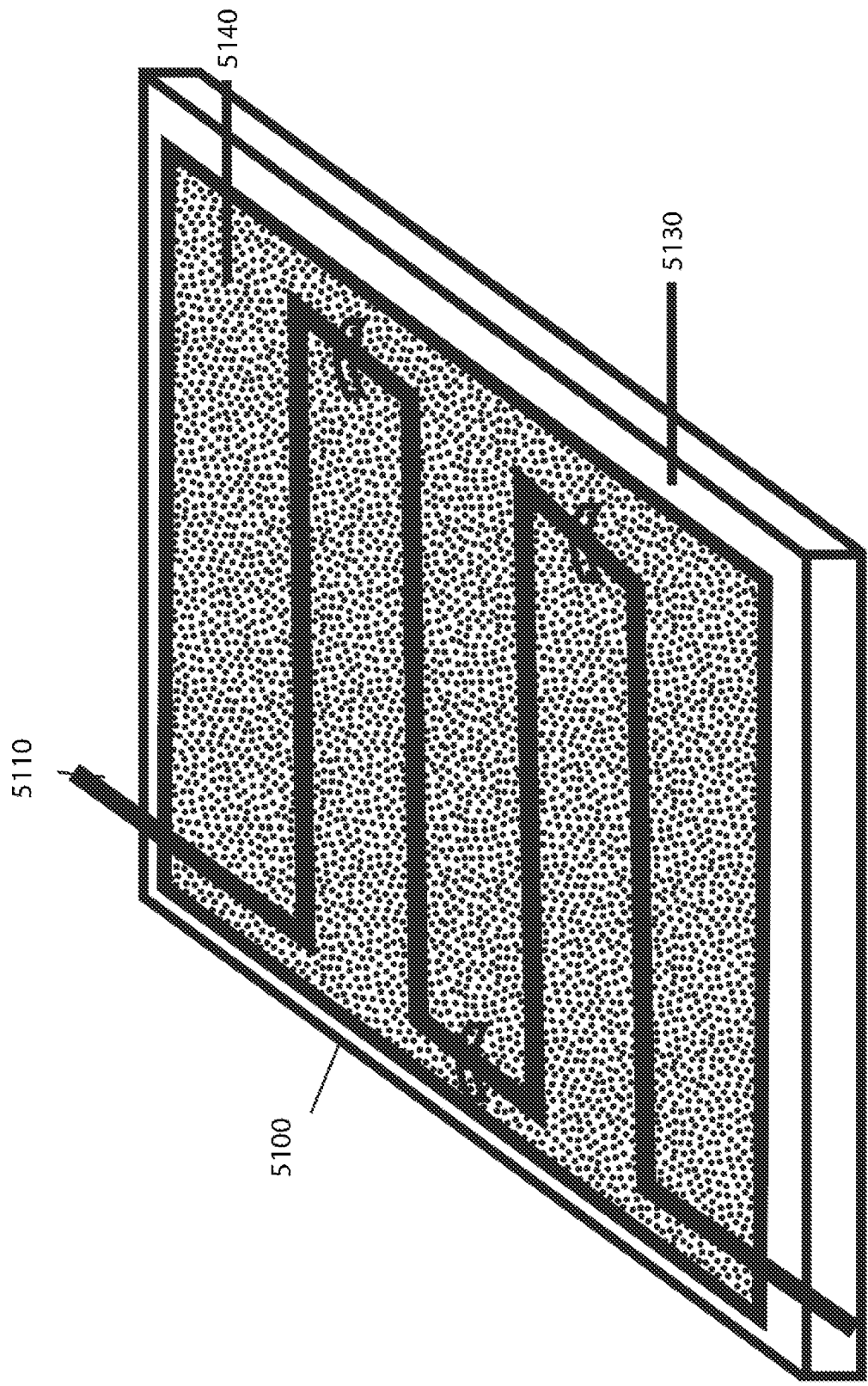
FIG. 5 shows an alternative solar thermal collector of the type used in a system according to FIG. 1.

As noted previously, alternatives to the solar energy absorber of FIGS. 4A-4B can be utilized as the second solar collector 1150 of FIG. 1. Such an alternative is illustrated in FIG. 5, which depicts a cement board solar thermal collector 5100 of the type known in the art with a duct 5110 for carrying a flow of heat transfer fluid disposed thereon and affixed by clips 5130 and with a layer of compressed expanded graphite 5140 disposed between the plate 5130 and the duct 5110 to absorb thermal energy from the plate and conduct it to the duct, all as within the ken of those skilled in the art in view of the teachings hereof.

Described above and illustrated in the drawings are systems, apparatus and methods meeting the objects set forth previously. It will be appreciated that the illustrated embodiments are only examples of the invention and that other embodiments differing from those shown and described herein are encompassed by the invention, as well. Thus, for example, while preceding examples describe some selected components of systems according to the invention, it will be understood by those practiced in the art that other components may be included in the fluid paths of these systems instead or in addition to those shown in the drawings and discussed above.

I claim:
1. A thermal energy collector, comprising
 A. a radiator system including
  i. a multi-wall panel, an interior of which is in fluid coupling with, and that forms part of, a fluid circuit through which flows one or more heat transfer fluids carrying thermal energy from one or more heat sources downstream of the radiator system,
  ii. each of a first face of the multi-wall panel and a second face of the multi-wall panel being substantially transparent in a visible spectrum and an infrared spectrum and radiating thermal energy from the heat transfer fluid into an ambient environment as that fluid flows through the multi-wall panel, the first face of the multi-wall panel passing sunlight, if any, to the heat transfer fluid, the second face of the multi-wall panel passing sunlight, if any, not absorbed by the heat transfer fluid via to a reflective surface disposed in a vicinity of a second face of the multi-wall panel,
  iii. the reflective surface reflecting thermal energy radiated into the ambient environment via the second face back toward the multi-wall panel,
 B. wherein
  i. the multi-wall panel is a first solar collector through which one or more of said heat transfer fluids flows to absorb energy from sunlight passing through the panel,
  ii. the fluid circuit being thermally coupled to one or more of the heat sources, the fluid circuit being operable to direct a said heat transfer fluid so as to dissipate heat from those one or more heat sources via the first solar collector,
 C. wherein the reflective surface prevents thermal energy contained within and/or passing through the first solar collector from warming that over which the first solar collector is disposed,

D. wherein the reflective surface forms part of a second solar collector.

2. The thermal energy collector of claim 1, wherein the second solar collector comprises:
   A. a thermally conductive via through which a second heat transfer fluid flows, and wherein
   B. the reflective surface being disposed to reflect and concentrate the sunlight that passes through the first solar collector onto the thermally conductive via.

* * * * *